Aug. 15, 1933.    H. N. HALVERSEN    1,922,362
LIQUID RECORDING GAUGE
Filed July 30, 1931    3 Sheets-Sheet 1
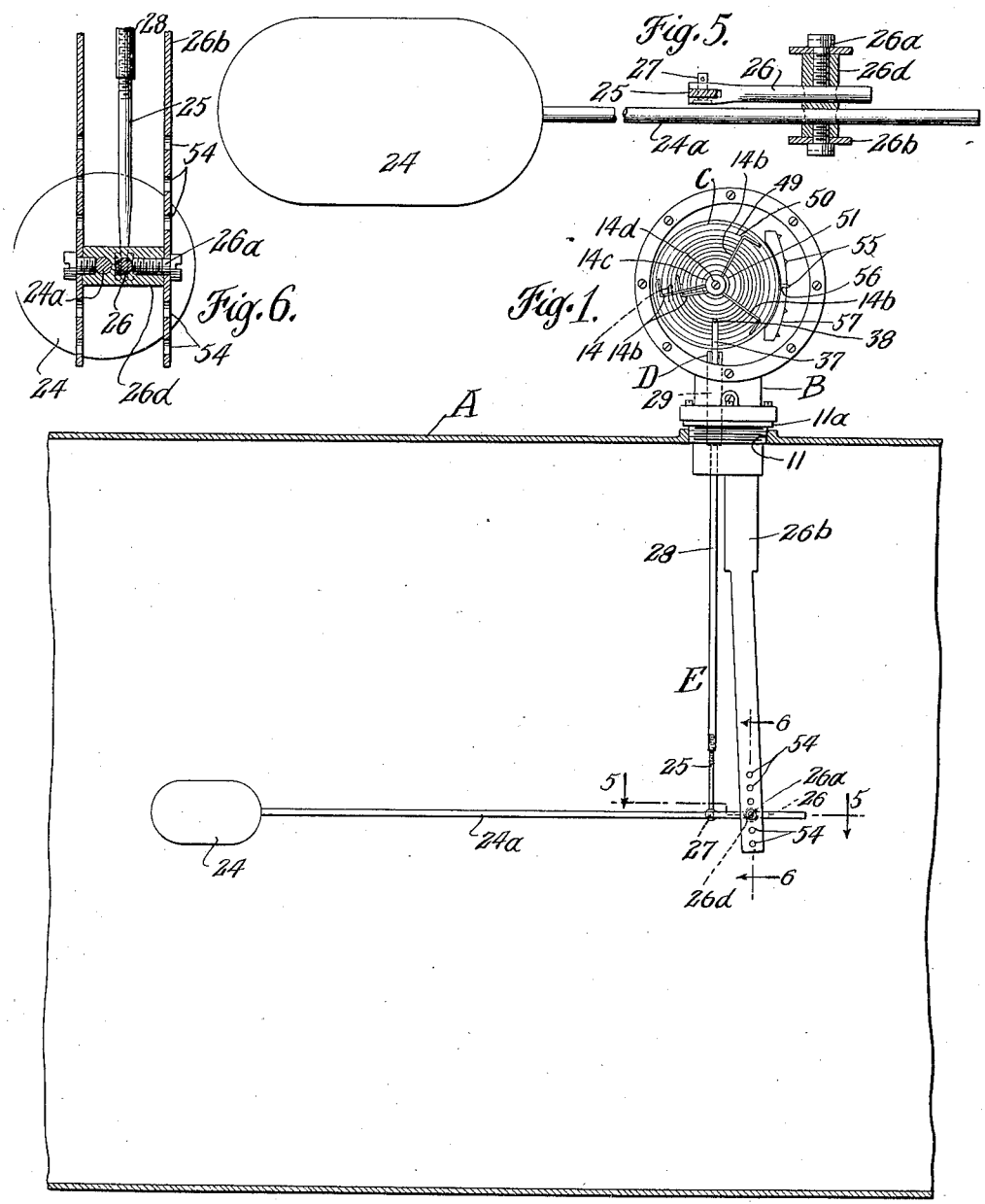
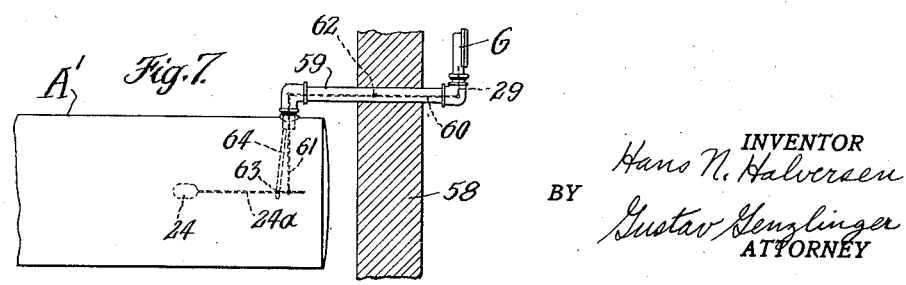
INVENTOR
Hans N. Halversen
BY Gustav Genzlinger
ATTORNEY

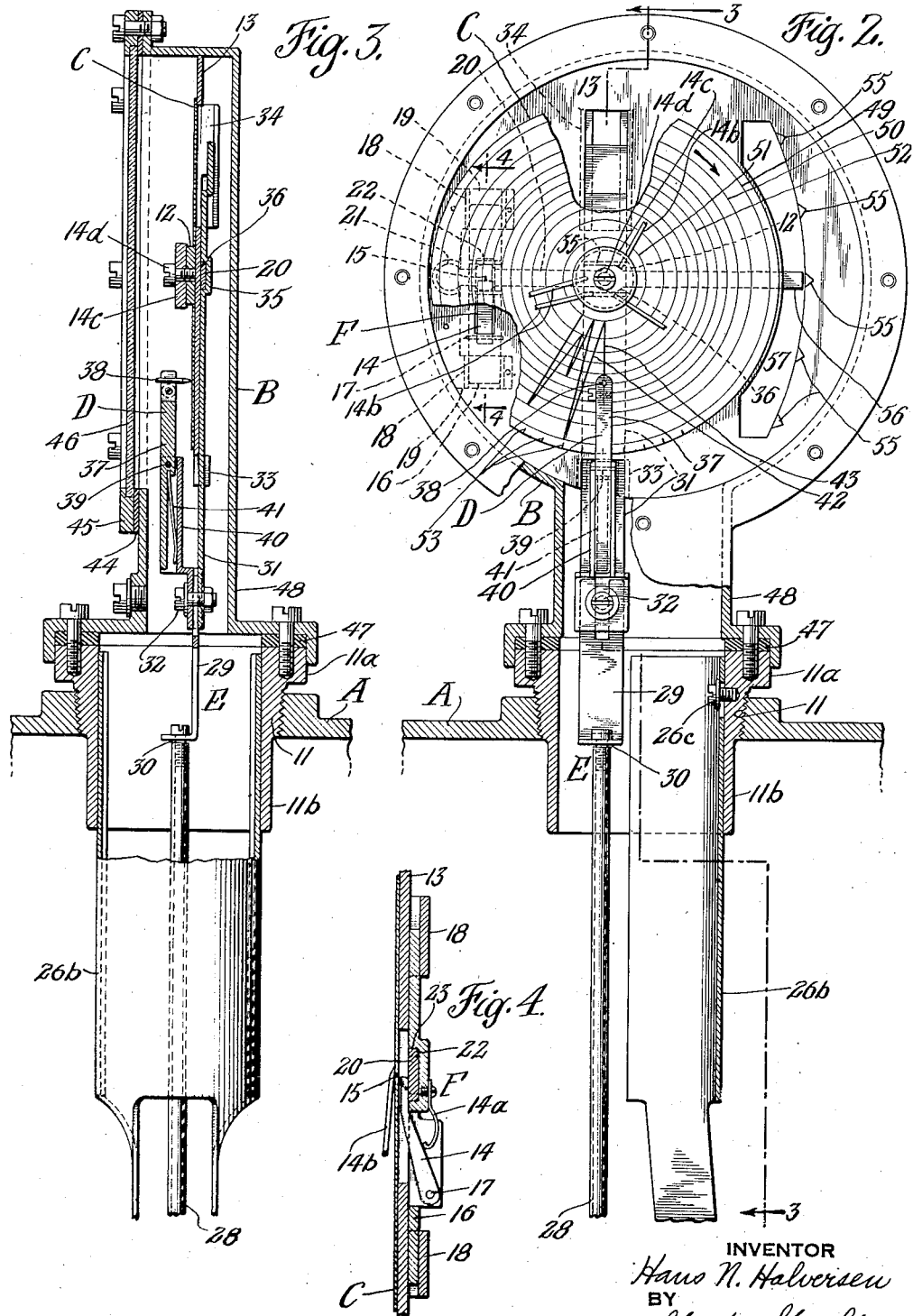

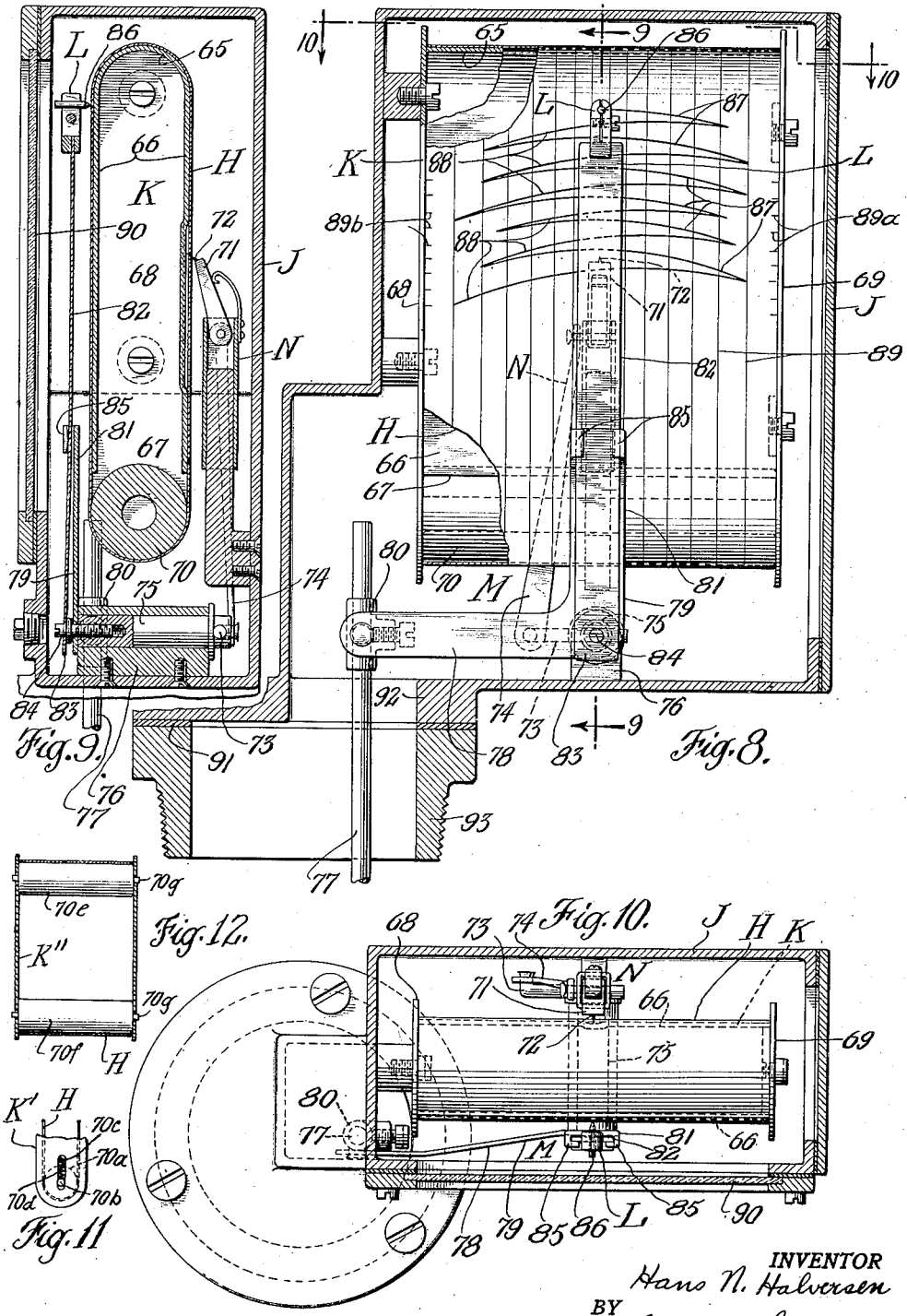

Patented Aug. 15, 1933

1,922,362

UNITED STATES PATENT OFFICE 1,922,362

LIQUID RECORDING GAUGE

Hans N. Halversen, Vineland, N. J.

Application July 30, 1931. Serial No. 553,923

8 Claims. (Cl. 234—34)

This invention relates to liquid recording gauges and is particularly useful in connection with oil storage tanks of oil burning installations.

One of the primary objects of my invention is the provision of a liquid recording gauge which is operable entirely by changes in level of the liquid being recorded.

Another object of my invention is the provision of a liquid gauge adapted to give a permanent record of the quantity of liquid which has been removed and added to a tank during periods of emptying and filling of the tank.

A further object resides in the provision of a gauge of the character described which is simple in construction, inexpensive to manufacture and accurate in its recordings.

Still another object resides in the provision of a recording gauge of such character that it may be readily adjusted for use in various sized and shaped tanks.

Another object of my invention is the provision of a recording gauge of such character that the recordings will not only indicate the amount of liquid added or removed from a tank but also will give an indication as to when such addition and removal was made.

A further object of my invention is the provision of a liquid recording gauge of such character that it may be used as a meter.

How the foregoing, together with such other objects and advantages as may hereinafter appear, or are incident to my invention, are realized is illustrated in the preferred form in the accompanying drawings wherein—

Fig. 1 is an elevational view of my recording gauge showing it applied to a liquid tank, the tank being shown in section.

Fig. 2 is an enlarged elevational view of the gauge with certain parts broken away and others shown in section.

Fig. 3 is a cross section through the gauge taken on the line 3—3 of Fig. 2.

Fig. 4 is an enlarged fragmentary sectional view taken on the line 4—4 of Fig. 2.

Fig. 5 is a fragmentary plan section taken substantially on the line 5—5 of Fig. 1.

Fig. 6 is a fragmentary cross section taken on the line 6—6 of Fig. 1.

Fig. 7 is a more or less diagrammatic view illustrating a modification of the invention.

Fig. 8 is a sectional elevational view of a modified form of the device.

Fig. 9 is a cross section of the modification illustrated in Fig. 8 and taken on the line 9—9 of that figure.

Fig. 10 is a plan section taken substantially on the line 9—9 of Fig. 8.

Fig. 11 is a fragmentary end view of a slight modification of the form of my invention illustrated in Figs. 8, 9 and 10.

Fig. 12 is a sectional elevational view of a modified arrangement of chart mounting.

In the drawings I have illustrated my invention as particularly applied to an oil tank A such as used for storing fuel oil to be burned in oil burning furnaces, although it will be understood that my invention is not limited to such use as it has a wide field of application.

The gauge comprises, in general, a casing B adapted to be secured in an opening 11 in the tank A, a record chart C, a marker device D, and mechanism indicated as a whole by the reference letter E for actuating the chart and marker device to effect recordings.

In the form of my invention illustrated in Figs. 1 to 7 the record chart C is in the form of a circular disc and is mounted for rotation on a collar 12 attached to a plate 13 secured in the casing B, which plate constitutes a backing for the chart, the chart being preferably made of stiff paper and being readily removable and replaceable. Rotation is imparted to the chart by means of a reciprocating device F comprising a pawl-like member 14 having a pusher pin 15 adapted to slightly prick the chart and cause rotation thereof when the pawl 14 moves in an upward direction. The pawl is carried by a mounting member 16 to which it is pivoted at 17, the member 16 being mounted for reciprocation in suitable guides 18 carried by a member 19 which is secured to the back of the plate 13.

Reciprocation is imparted to the mounting member 16 by means of an arm 20 which is pivoted at 21 in the member 19, the arm 20 having a bulged portion 22 fitting a recess 23 in the member 16 (see Fig. 4). The arm 20 is rocked on its pivot 21 by means of a float 24 in the tank A through the medium of a link connection to the float comprising a rod 25 connected to an arm 26 at 27, a link member 28 and a connecting member 29. The rod 25 is screw threaded into the lower end of the link member 28 and the connecting member 29 has a loose connection with the link member 28 as indicated at 30 in Figs. 2 and 3 adapted to compensate for the angular movement of the member 28 and rod 25. The connecting member 29 is attached to a bar 31 by means of a bolt 32 and the bar 31 is mounted for up and down reciprocation in the guides 33 and 34 which are provided on the rear face of the plate 13. The bar 31 is provided with a recessed portion 35 adapted to receive the arm 20, which arm is provided with a second bulged portion 36 which engages the edges of the recess 35. The float arm 24a is pivoted at 26a in a bifurcated bracket 26b, which bracket is secured as by means of the screws 26c in a flanged neck 11a screwed in the opening 11 of the tank, it being noted that both the arm 26 and the float arm 24a are adjustably secured in a pivot block 26d carried by the bracket 26b. The flanged neck 11a has a downwardly extending nipple portion 11b which serves to bottle up pressure in the gauge, thus preventing liquid from getting into the gauge.

When the level of the liquid rises and falls the float will be raised and lowered and the arm 20 will be rocked up and down on its pivot 21. The pawl 14 will thus be reciprocated up and down and when moving in an upward direction, the pin 15 of the pawl pricks the chart and causes rotation thereof in the direction of the arrow shown in Figure 2. The pawl 14 is held in spring pressed engagement with the chart by means of a spring 14a and the chart is held against displacement from the collar 12 by means of a plurality of spring arms 14b which are carried by a collar 14c rigidly secured to the plate 13 by means of a screw 14d. When the pawl 14 moves in a downward direction its grip on the chart is released and the chart remains in the extreme position of rotation to which it was moved in the upward movement of the pawl. The tension of the spring arms 14b against the front face of the chart prevents rotation of the chart in a direction opposite to the arrow shown in Figure 2.

The marker device D comprises an arm 37 carrying a readily replaceable marking element or stylus such as a pencil 38 and pivoted at 39 in a supporting member 40, which member is detachably and adjustably secured to the bar 31 and connecting member 29 by means of the bolt 32. The arm 37 is spring pressed by means of a spring 41 in a direction to hold the pencil 38 in contact with the chart C. It will thus be seen that when the float moves up and down, the marker device, because of its connection to the member 29, reciprocates up and down and causes markings to be made on the chart.

In this connection it is pointed out that when the marker device D and the connected bar 31 move upwardly under control of the float a non-radial line such as indicated at 42 in Figure 2 is recorded on the chart because the chart C is being rotated by the reciprocating device F at the same time as the marker is moving upwardly. However, when the marker device and bar 31 move downwardly a radial line is recorded on the chart as indicated at 43 because the chart C remains stationary as the marker moves downwardly due to the pawl 41 releasing its grip on the chart. The radial lines on the chart, therefore, denote emptying of the tank and the non-radial lines denote filling of the tank.

The gauge is effectively sealed against leakage to the exterior by a suitable packing 44 between the retainer ring 45 for the glass 46 and a suitable packing 47 between the neck portion 48 of the casing B and the flanged neck 11a which is secured in the tank A. Any suitable form of protective seal may be associated with the retainer ring 45 and the neck portion 48 of the casing to give an indication of unauthorized removal of the gauge or the glass front.

In order to be enabled to determine the quantity of liquid that each recording on the chart represents I preferably graduate the chart with a plurality of concentric circles. In the particular device illustrated the tank has a capacity of 250 gallons and the graduations are arranged to each represent 25 gallons, i. e., the outermost circle 49 (see Figs. 1 and 2) is the zero circle, the next smaller circle 50 represents 25 gallons, the next 50 gallons, the next 75 gallons, and so on to the smallest circle 51 which represents 250 gallons. In other words, a recording mark extending from one circle to the next circle gives an indication that 25 gallons has either been withdrawn from the tank or supplied thereto according to whether the line is radial or non-radial. For example, the line 43 in Fig. 2 being a radial line and extending from the smallest circle 51 to the middle circle 52 indicates that 125 gallons has been withdrawn from the tank and the line 42 being a non-radial line and extending from the largest circle 49 to the smallest circle 51 indicates that 250 gallons had previously been supplied to the tank.

It is pointed out that the chart is graduated or calibrated in accordance with the shape of tank employed and when a tank of round or oval cross-section is employed the circles are of different spacing as clearly shown in Fig. 2, in which the space between circles is progressively smaller from the outside circle 49 to the middle circle 52 and then progressively larger from the middle circle to the smallest circle 51. If a tank of rectangular cross-section were employed all of the spacing would be the same.

Since a radial line is recorded on the chart when liquid is withdrawn and a non-radial line when liquid is supplied, it will be be seen that by reading the length of the lines with the aid of the graduations the user is enabled to tell how many gallons were supplied and how many were withdrawn or consumed. Thus the user may keep an accurate check not only on the consumption of oil in the case of oil burning apparatus, but also on his purchases of oil. In other words, the user may determine exactly how many gallons were put into the tank at any particular filling thereof and also may determine how many gallons were used after such filling. Furthermore, the recordings give an indication as to how many gallons may be added to fill the tank to capacity. For example, if the gauge shows that 100 gallons of oil are still in the tank, then the user knows he can order 150 gallons to be added without danger of overflow.

The chart may be provided with peripheral graduations as indicated at 53 in Figure 2 which may be marked with characters for identifying just where readings were taken for the purpose of check up. By keeping a record of the dates or time represented by the peripheral graduations, the user may calculate exactly how much oil was consumed in a certain period of time, how many fillings were made, and how many gallons added in the fillings. In some instances it may be desirable to extend the markings 53 radially inward to the center of the chart.

The device may be readily adjusted for tanks of different sizes and shapes through means of a few simple adjustments, it being noted that a plurality of spaced holes 54 are provided in the arms of the bracket 26b, thus enabling the pivot block 26d to be moved to any one of a number of positions in the bracket. The rod 25 may be adjusted in the link member 28 by means of its screw threaded connection therewith and the connecting member 29 may be adjusted with relation to the bar 31 and member 40 to correspond to the adjustment of the float. Also the float arm 24a and arm 26 may be axially adjusted in the pivot block 26d.

In addition to the recording chart I also have provided arcuately arranged spaced markings 55 on the front face of the plate 13 to give an indication as to the level of the oil in the tank. The arm 20 above referred to has an extended portion 56 which serves as a pointer cooperating with the markings 55, it being noted that an arcuate opening 57 is provided in the plate 13 to expose the extended portion 56 to view. In the position shown in Figs. 1 and 2 the pointer indicates that the tank is half full.

Referring now to the form of my invention illustrated in Fig. 7 it will be seen that I have shown my recording gauge mounted at a point removed from the tank containing the liquid to be gauged. Such an arrangement is particularly advantageous in cases where an oil tank is buried in the ground outside of a building and where it is desired to have the gauge inside of the building. In Figure 7 the tank A' is located outside of the building, a wall of which is indicated at 58, and the gauge G is located inside the building and is carried by a pipe 59 leading from the tank. The gauge illustrated is of the same form as that described above and the connecting member 29 thereof is operatively connected to the float 24 by means of a lever 60 and rod 61 located within the pipe 59 and its fitting and the rod 61 extends downward through the top opening in the tank for connection to the float arm 24a. The lever 60 is pivoted at 62 in the pipe 59 and the float arm 24a is pivoted at 63 in a bracket 64. As the level of the liquid in the tank changes the float rises and falls and the gauge is operated as described above.

Referring to the modification of my invention illustrated in Figs. 8, 9 and 10, the device comprises in general a chart H in the form of an endless band or sheet, a casing J carrying a mounting K for the chart, a marker device L, and mechanism indicated as a whole by the reference letter M for actuating the chart and marker device to effect recordings.

The chart H is mounted to move on the mounting K in the manner of a belt and the mounting K is provided with a curved top 65, straight sides 66, and open bottom 67, a fixed end 68 and a removable end 69. A floating roller 70 extending from the end 68 to the end 69 is provided at the open bottom of the mounting K and serves by reason of its weight to hold the chart under tension and aids in causing free movement of the chart by the actuating mechanism M. The chart may be readily removed and replaced by removing the end 69 of the mounting K and sliding it on and off endwise of the mounting.

Movement is imparted to the chart by means of a reciprocating device N comprising a spring pressed pawl-like member 71 having a pusher pin 72 adapted to slightly prick the chart and cause movement thereof. Since the device N is mounted at the rear run of the endless chart the front run thereof at which the marker device L is located will move downwardly as the pawl 71 moves upwardly. As the pawl moves downwardly the pin 72 releases its grip on the chart and the chart stands still.

The pawl is given its reciprocatory movement by means of the actuating mechanism M comprising an arm 73 and link 74, the arm 73 being secured in a rock shaft 75 mounted in a bracket 76 secured to the casing J. Rocking motion is imparted to the rock shaft 75 by means of a rod 77 which is connected at its lower end to float mechanism which may be arranged as illustrated in Fig. 1. The upper end of the rod 77 is adjustably and pivotally connected to the lower arm 78 of a bell crank lever 79 by means of a connecting member 80. The bell crank lever 79 is secured to the rock shaft 75, and it will be seen, therefore, that as the float and rod 77 move up and down the rock shaft 75 is correspondingly rocked.

The upper arm 81 of the bell crank lever carries a spring arm 82, the lower end 83 of which is provided with an aperture fitting the head portion of an adjusting screw 84, and the upper end of which carries the marker device L. The spring arm 82 is held against displacement by means of lugs 85 provided at the upper end of the arm 81 of the bell crank lever. The pressure of the pencil 86 of the marker device L against the chart may be adjusted by means of the screw 84.

When the float moves up and down, markings are recorded on the chart by virtue of the bell crank and rod connection to the float arm, as will be clear from inspection of Fig. 8. It will be noted that every other mark 87 recorded on the chart is struck from the center of rock of the bell crank lever, while the remaining marks 88 are in the nature of inclined arcs connecting the opposite ends of the marks 87. The reason for this is that the marks 87 are recorded when the chart is stationary, and the marks 88 are recorded when the chart is moving under influence of the reciprocating device N. The marks 87, therefore, represent emptying of the tank since they are recorded when the float is falling, at which time the pawl tends to release its grip on the chart and the marks 88 represent filling of the tank, since they are recorded when the float is rising, at which time the pawl pricks the chart and causes the chart to move downwardly at the front or recording side.

In this instance the chart is provided with a plurality of parallel lines 89, the spacing of which is calibrated to correspond to the size and shape of the tank in a manner similar to the concentric circles described in connection with the first form of my invention. By reading the length of the arcuate markings with the aid of the lines 89, the number of gallons added at each filling, or the number of gallons withdrawn or consumed at each emptying, may be readily determined, the lines 89 being spaced to represent a predetermined number of gallons. Graduation marks 89a and 89b may be provided along the edges of the chart as illustrated in Fig. 8 for the keeping of records in the manner above explained in connection with the marks 53 shown on the circular chart in Fig. 2.

A sealed glass front 90 is provided and suitable packing 91 is located between the lower neck portion 92 of the casing J and the threaded neck 93 which screws into the threaded opening in the tank.

Referring now to the modification illustrated in Fig. 11, it will be seen that the roller 70a corresponding to the roller 70 of Fig. 8 is provided with a shaft 70b mounted in elongated slots 70c in the ends of the mounting K'. The roller 70a is adapted to be pressed downwardly to keep the chart H under tension by means of springs 70d which may be mounted in the slots 70c.

In Fig. 12 I have illustrated a modification in which an upper roller 70e and a lower roller 70f for the chart H are provided in the mounting K″. Both rollers in this instance are provided with shafts 70g having bearings in the mounting K″. The lower roller 70f may, however, be of the form shown in Fig. 8 or may be spring pressed as shown in Fig. 11.

It will be seen from the foregoing that I have provided a very simple and accurate liquid recording gauge operated entirely by changes in level of the liquid, thereby eliminating the use of mechanical or electrical devices such as clock mechanisms, or motor devices.

The device of my invention may also be employed as a meter. For example, readings of the chart may be taken from time to time to determine how many gallons of oil were consumed between readings very much after the fashion of gas and electric meter readings.

It is also pointed out that the device is very well adapted to be made largely of sheet metal punchings and stampings, thus greatly reducing the cost of manufacture.

I claim:—

1. In a liquid gauge, the combination of a movable chart, a movable marker associated therewith, a float, means connecting the marker to the float to be moved thereby, and means adapted to be reciprocated by the float for moving the chart, said reciprocating means including pawl-like means adapted to directly engage and move the chart in one direction of reciprocation only.

2. In a liquid recording gauge, the combination of a movable chart, a marker associated with the chart to mark recordings thereon, a float, means connecting the marker to the float to move the marker as the level of liquid changes, pawl-like means adapted to directly engage the chart, and means connecting the float to said pawl-like means to move it in one direction as the level of liquid rises and to move it in the opposite direction as the level of the liquid falls, said pawl-like means being adapted to increase its grip on the chart when moving in one direction and to decrease its grip when moving in the other direction.

3. In a liquid recording gauge, the combination of a movable chart, a marker associated with the chart to mark recordings thereon, a float, means connecting the marker to the float to move the marker as the level of liquid changes, pawl-like means adapted to directly engage the chart, and means connecting the float to said pawl-like means to move it in one direction as the level of liquid rises and to move it in the opposite direction as the level of the liquid falls, said pawl-like means being adapted to increase its grip on the chart when moving in one direction and to decrease its grip when moving in the other direction, together with friction means for preventing unintended movement of the chart.

4. In a liquid recording gauge, the combination of a movable chart, a marker associated with the chart to mark recordings thereon, a float, means connecting the marker to the float to move the marker as the level of liquid changes, pawl-like means spring held in engagement with the chart, means connecting the float to said pawl-like means to effect reciprocation thereof, said pawl-like means being adapted to increase its grip on the chart when moving in one direction, and to decrease its grip when moving in the opposite direction, and means holding the chart against movement when the pawl-like means is moving in its direction of decreased grip on the chart.

5. In a liquid recording gauge, the combination of a rotatable chart, a reciprocable marker associated therewith, a float, means for imparting reciprocatory motion to the marker from the float and means for imparting rotative movement in one direction to the chart from the float including a reciprocating pawl device operated by the float and having means directly engaging the chart.

6. In a liquid recording gauge of the type employing a stylus and chart, an endless record chart, means for movably supporting said chart, and means directly engaging said chart on one run thereof to move it in one direction, said moving means being actuated through means responsive to changes in liquid level.

7. In a liquid recording gauge of the type employing a stylus and chart, an endless record chart, a fixed support for movably supporting said chart, a floating roller carried by the endless chart to maintain the chart under tension, and means engaging the chart to cause movement thereof.

8. In a liquid gauge, the combination of a movable chart, a movable marker associated therewith, a float, means connecting the marker to the float to be moved thereby, and means adapted to be reciprocated by the float for moving the chart, said reciprocating means including a pawl-like member having a pin point adapted to prick the chart and thereby move it in one direction of reciprocation only.

HANS N. HALVERSEN.